No. 606,772. Patented July 5, 1898.
A. H. SMITH & W. A. BRAINARD.
CAR WHEEL AND AXLE GAGE.
(Application filed Mar. 1, 1897. Renewed Dec. 16, 1897.)
(No Model.)
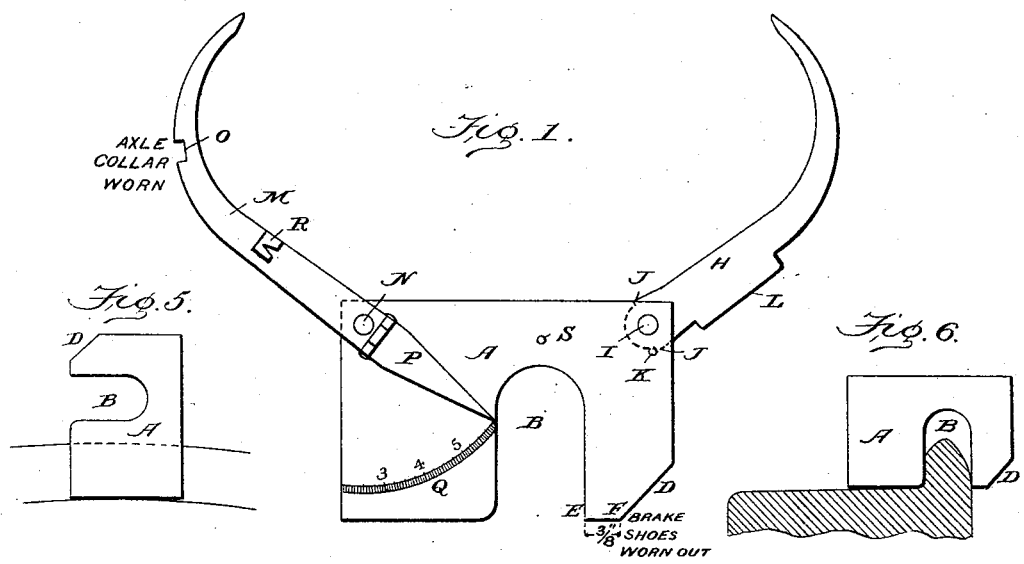
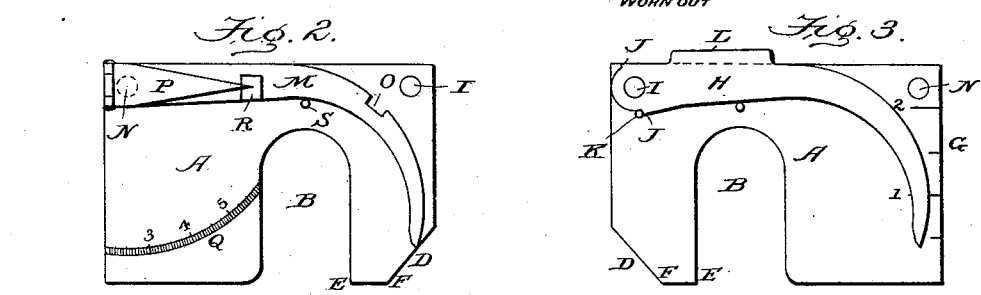
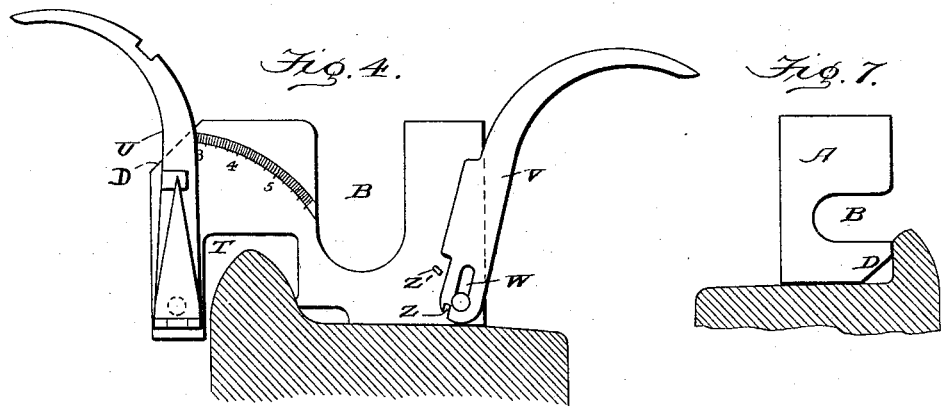
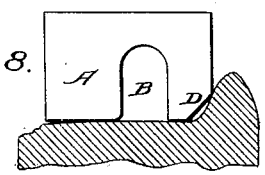
WITNESSES
INVENTORS
Alfred H. Smith
Walter A. Brainard
BY
F. E. Stebbins
ATTORNEY.

UNITED STATES PATENT OFFICE.

ALFRED H. SMITH AND WALTER A. BRAINARD, OF YOUNGSTOWN, OHIO.

CAR WHEEL AND AXLE GAGE.

SPECIFICATION forming part of Letters Patent No. 606,772, dated July 5, 1898.

Application filed March 1, 1897. Renewed December 16, 1897. Serial No. 662,207. (No model.)

*To all whom it may concern:*

Be it known that we, ALFRED H. SMITH and WALTER A. BRAINARD, citizens of the United States, residing at Youngstown, in the county of Mahoning and State of Ohio, have invented certain new and useful Improvements in Wheel, Axle, and Brake-Shoe Gages, of which the following is a specification sufficiently full, clear, and accurate to enable those skilled in the art to make and use the same.

The object of our invention is the production of a gage suitable for all the uses of the Master Car-Builders' gage, and in addition thereto adapted for gaging axles, axle-collars, brake-shoes, &c.

With this object in view our invention consists, first, in forming from a flat piece of metal a gage for measuring car-wheels and adding thereto pivoted arms.

Further, it consists in providing one of the arms with a hinged pointer.

Still further, it consists in a gage having arms pivoted thereto on opposite sides, so that the said arms may be folded without interfering one with the other, and, finally, it consists in certain novelties of construction and combinations of parts hereinafter set forth and claimed.

Like reference characters designate like parts in the several views.

Figure 1 is a view in elevation of our complete tool with arms extended; Fig. 2, a view of one side, showing the left arm folded; Fig. 3, a view indicating the position of the right arm when folded. Fig. 4 is an illustration of a modified form of gage adapted for the additional function of measuring the thick flanges of wheels. Figs. 5, 6, 7, and 8 show certain methods of applying the tool to wheels for gaging shelled and flat spots, thin flanges, worn flanges, and chipped rims.

A is the plate constituting the body of the gage and having a part of the metal cut away to form a recess B, approximately one and three-fourths inches long and one inch wide. Within this opening the flange of the wheel enters, as shown in Fig. 6, when the tool is used to gage thin flanges. One corner of the plate is also cut away at D, so the tool can be applied, as shown in Figs. 7 and 8, to gage flanges and rims. The distance from E to F (about three-eighths of an inch) is made suitable for the measurement of the wear of brake-shoes. G is a scale along one edge ruled to two and a half inches and measures "slid" flat wheels, as shown in Fig. 5.

H is an arm pivoted to the side of the plate by means of the pin I. On the arm are fashioned shoulders J, which engage a stop K, and thus limit the movements of the arm and hold it rigid when open and closed. The projection L is a gage for ascertaining the wear of the tread of a wheel.

M is an arm pivoted to the plate by pin N. A notch is cut in the metal at O for gaging the collar of an axle. To the end of arm N is hinged in any convenient or well-known way a pointer P, which travels along a scale Q when the arm is rotated. The end of the pointer when folded is protected by a guard R on arm M. This guard may be formed by increasing the thickness of the metal and then removing a portion thereof to form a recess for the point. A stop-rivet S limits the movement of the arm when closed.

Both arms are preferably curved and pointed, as shown in the several views; but these features are not absolutely essential, though desirable. They are, it should be observed, pivoted to the plate on opposite sides or surfaces, so that each arm may be closed without interfering with the other and the whole tool be brought within a very small compass.

In Fig. 4 the metal of the plate is cut away at T to form a gage for the thick flanges of wheels. The arms U and V are quite like those in Fig. 1, except that arm V is slotted at W and provided with a recess at Z for engaging pin Z', which locking means retains the arm in a rigid position.

Each example of the gage, as illustrated in Figs. 1 and 4, is made up of a plate and two pivoted arms and constitutes a caliper adapted when open for insertion within a journal-box and for being easily applied to the axle for the purpose of determining the diameter thereof. One arm being held rigid by the stop and the other revolved, the pointer instantly indicates the measurement upon the scale.

The tool illustrated in Fig. 1 is adapted for measuring diameters varying from two and one-half up to six inches.

While we have shown only two examples of the physical embodiment of our invention, we do not wish to be understood as thereby excluding from the scope of our claims other embodiments and forms involving a construction substantially like the said examples and for the same purpose. Minor changes likewise may be introduced in manufacture and equivalents used for the several parts shown and our improvements still be embodied. All such and other colorable changes we intend to embrace within the scope of our invention.

What we claim as new, and desire to secure by Letters Patent, is—

1. A plate-metal gage, for measuring car wheels and axles, having a recess in the body thereof for the purpose specified, a scale on the face, and provided with two caliper-arms pivoted at opposite ends of the plate, one of said arms registering with the scale, in substance as set forth.

2. A recessed plate-metal gage adapted for measuring car wheels and axles having two arms pivoted thereto at different points on opposite sides or faces, one of said arms being provided with a pointer registering with a scale on the face of the plate, and both said arms folding in planes parallel with the plate, so that the gage can be brought within a small compass, in substance as set forth.

3. A gage for car-wheels having two pivoted arms and one of said arms provided with a hinged pointer, substantially as described.

4. A gage for car-wheels having a scale on the body thereof, and two pivoted arms, one of said arms being provided with a hinged pointer adapted to the scale, in substance as set forth.

5. In combination with a car-wheel gage, a curved arm provided with a hinged pointer, said arm having a guard R to protect the end of the pointer when folded, in substance as set forth.

6. A car-wheel gage having two arms pivoted at different points, one of said arms having a pointer adapted to a scale on the gage and the other arm provided with a shoulder adjacent the pivot for engaging a stop on the body of the gage, as set forth.

7. A car-wheel gage consisting of a metal plate having a recess B, caliper-arms pivoted at the corners, and one corner of the plate cut away from D to F, adapting the gage for measuring chipped rims and worn flanges, in substance as described.

In testimony whereof we affix our signatures in presence of two witnesses.

ALFRED H. SMITH.
WALTER A. BRAINARD.

Witnesses:
DAVID S. EVANS,
C. BURROWES.